US010012345B2

(12) United States Patent
Derby et al.

(10) Patent No.: US 10,012,345 B2
(45) Date of Patent: Jul. 3, 2018

(54) METHOD AND APPARATUS FOR AN ICEMAKER ADAPTER

(71) Applicant: Lancer Corporation, San Antonio, TX (US)

(72) Inventors: Jack Derby, La Vernia, TX (US); Kevin R. Long, Seguin, TX (US); Bradley R. Glidden, San Antonio, TX (US); Michael Angelica, Lytle, TX (US)

(73) Assignee: Lancer Corporation, San Antonio, TX (US)

( * ) Notice: Subject to any disclaimer, the term of this patent is extended or adjusted under 35 U.S.C. 154(b) by 315 days.

(21) Appl. No.: 14/955,524

(22) Filed: Dec. 1, 2015

(65) Prior Publication Data

US 2017/0152133 A1     Jun. 1, 2017

(51) Int. Cl.
| | |
|---|---|
| *B67D 1/06* | (2006.01) |
| *B67D 1/08* | (2006.01) |
| *B23P 15/26* | (2006.01) |
| *F16M 13/02* | (2006.01) |
| *F25C 1/00* | (2006.01) |
| *F25D 23/00* | (2006.01) |

(52) U.S. Cl.
CPC ............... *F16M 13/02* (2013.01); *B67D 1/06* (2013.01); *F25C 1/00* (2013.01); *F25D 23/00* (2013.01); *B67D 2210/00034* (2013.01); *F25C 2500/02* (2013.01)

(58) Field of Classification Search
CPC ............ B67D 1/06; B67D 2210/00034; B67D 2210/00036; F16M 13/02
USPC ..................................................... 248/346.07
See application file for complete search history.

(56) References Cited

U.S. PATENT DOCUMENTS

| | | | |
|---|---|---|---|
| 7,168,261 B2 | 1/2007 | Grewal et al. | |
| 8,251,259 B2 * | 8/2012 | Edwards | .................. B67D 1/06 222/129.1 |
| 8,899,072 B2 * | 12/2014 | Veettil | ..................... F25C 5/182 222/129.1 |
| 2004/0263036 A1 | 12/2004 | Zizas | |

OTHER PUBLICATIONS

International Search Report for PCT/US16/63264.

* cited by examiner

*Primary Examiner* — Christopher R Zerphey
(74) *Attorney, Agent, or Firm* — Christopher L. Makay

(57) ABSTRACT

An adapter that integrates an icemaker with a beverage dispenser includes a base defining a passage therethrough and at least a first bracket. The base includes a first rail and a second rail, and a top of the base may support thereon at least a portion of the icemaker. The first bracket includes a first rail engagement member engageable with the first rail and a second rail engagement member engageable with the second rail. The bracket inserts within the passage of the base such that the first rail element member engages the first rail and the second rail engagement member engages the second rail. The bracket is movable along the first and second rails to accommodate icemakers having different dimensions.

19 Claims, 6 Drawing Sheets

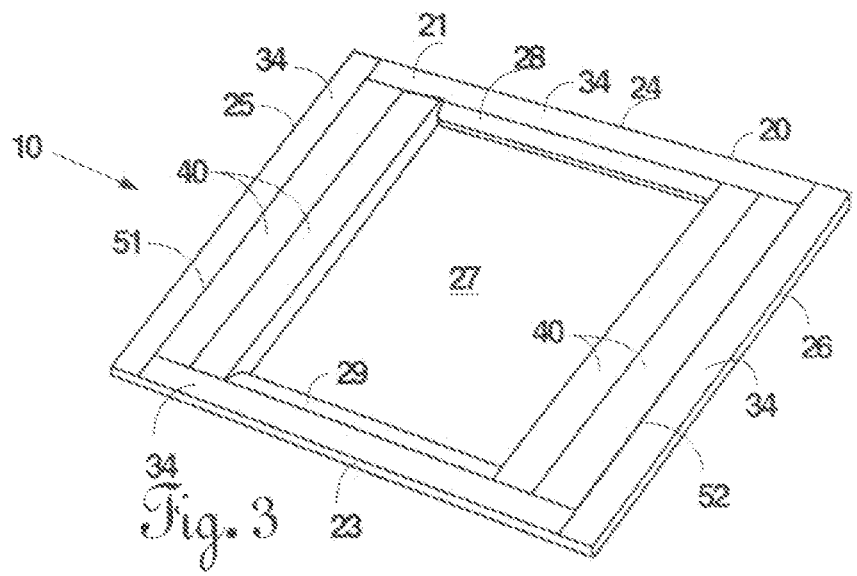
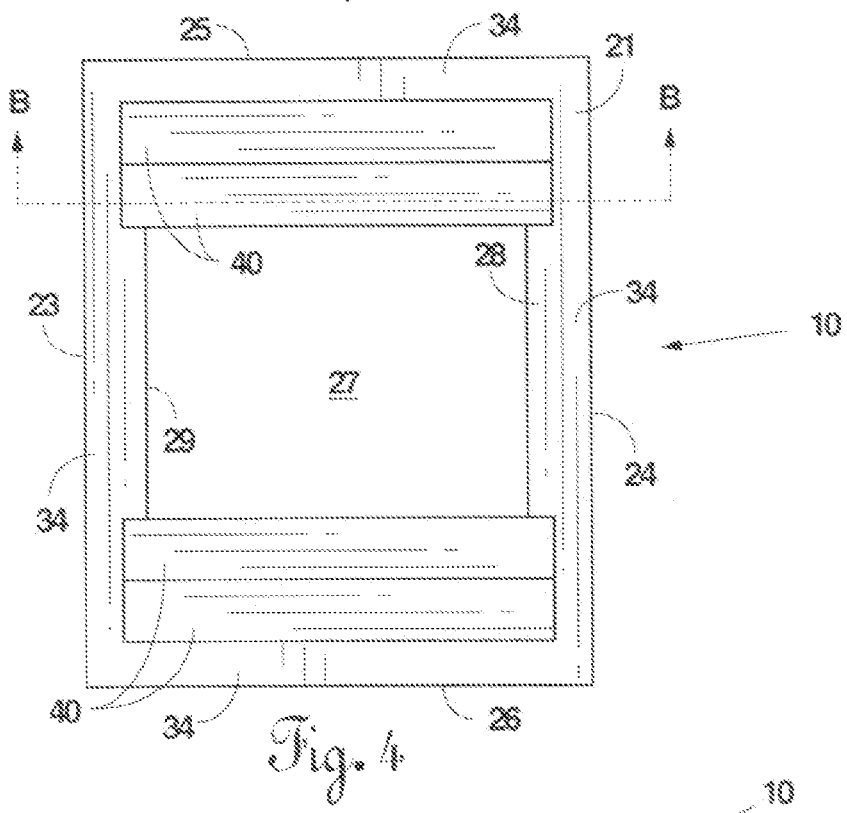
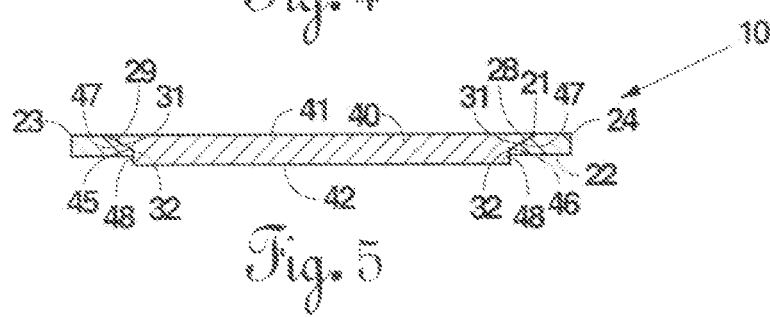

METHOD AND APPARATUS FOR AN ICEMAKER ADAPTER

BACKGROUND OF THE INVENTION

1. Field of the Invention

The present invention relates to adapting icemakers to beverage dispensers and, more particularly, but not by way of limitation, to methods and an apparatus for an icemaker adapter.

2. Description of the Related Art

In the areas of food and beverage dispensing, manufacturers are often forced to provide a variety of dispenser sizes and capacities to accommodate customer requirements. Beverage dispenser manufacturers also typically have optional equipment that may be utilized in alternate configurations. The presence of these multiple configurations along with optional equipment suggests that the sales force must be intimately familiar with the product lines, the limitations of the product lines, as well as variations thereof.

Illustratively, icemakers are an example of optional equipment that is often utilized with beverage dispensers. Icemakers are typically placed on top of the beverage dispensers. In this configuration, ice made within the icemakers drops directly into the beverage dispensers for later dispensing to customers. Adapters are used to ensure a proper fit between the icemakers and the beverage dispensers. Often manufacturers have numerous beverage dispensers and icemakers. Therefore, the manufacturers must have multiple adapters to meet the various combinations of beverage dispensers and icemakers thereby increasing inventory and work for the sales team.

An adjustable adapter would allow for use in multiple applications. This has a number of benefits such as lowering inventory costs for a manufacturer and reducing part numbers for the sales team. For example, an adjustable adapter has the benefit of allowing a sales team to lessen the number of adapters that are needed to fit an icemaker to a beverage dispenser. Accordingly, an adjustable adapter that ensures proper fit between beverage dispensers and icemakers would be beneficial.

SUMMARY OF THE INVENTION

In accordance with the present invention, an adapter allows different icemakers to integrate with a beverage dispenser. The adapter includes a base defining a passage therethrough, at least a first bracket, and a lid that fits over and engages the sides of the beverage dispenser in order to conceal a storage chamber area of the beverage dispenser.

The base includes a first rail and a second rail, and a top of the base may support thereon at least a portion of the icemaker. Specifically, the top of the base includes receiving surfaces that support thereon at least a portion of the icemaker. A bottom of the base includes a stop that secures the base with the beverage dispenser. The stop includes internal and external lips extending from the bottom of the base that secure the base with the beverage dispenser. The first rail and the second rail of the base border the passage between a first side and a second side of the passage. Furthermore, the first rail and the second rail include a first bracket engagement surface and a second bracket engagement surface that engage the first bracket.

The first bracket includes a first rail engagement member engageable with the first rail of the base and a second rail engagement member engageable with the second rail of the base. The first rail engagement member and the second rail engagement member of the first bracket each include a first rail engagement surface that engages the first bracket engagement surface and a second rail engagement surface that engages the second bracket engagement surface. The bracket inserts within the passage of the base such that the first rail engagement member engages the first rail and the second rail engagement member engages the second rail. The bracket is movable along the first and second rails to accommodate icemakers having different dimensions.

Integrating the icemaker with the beverage dispenser using the first bracket involves inserting the first bracket within the passage of the base and moving the first bracket within the passage along the first and second rails until the first bracket resides against either the first side or the second side of the passage. The icemaker is placed atop the adapter over the beverage dispenser. The icemaker sits atop the first bracket and at least a portion of the top of the base such that the icemaker is offset from a central portion of the passage.

The adapter may further include a second bracket substantially identical to the first bracket. The second bracket inserts within the passage such that the second bracket resides adjacent the first bracket. The icemaker is placed atop the adapter over the beverage dispenser such that the icemaker sits atop the first bracket and the second bracket and at least a portion of the top of the base such that the icemaker is offset from a central portion of the passage. Alternatively, the second bracket inserts within the passage and is moved within the passage such that the second bracket resides opposite the first bracket against either the first side or the second side of the passage. The icemaker is placed atop the adapter over the beverage dispenser such that the icemaker sits atop the first and the second bracket and is positioned in a central portion of the passage.

BRIEF DESCRIPTION OF DRAWINGS

FIG. 3 is a perspective view illustrating a base and brackets of the adapter.

FIG. 4 is a top view illustrating the base and the brackets of the adapter.

FIG. 5 is a cross-sectional side view taken along line B,B of FIG. 4 illustrating the base and the brackets of the adapter.

DETAILED DESCRIPTION OF THE PREFERRED EMBODIMENT

Figure 1:
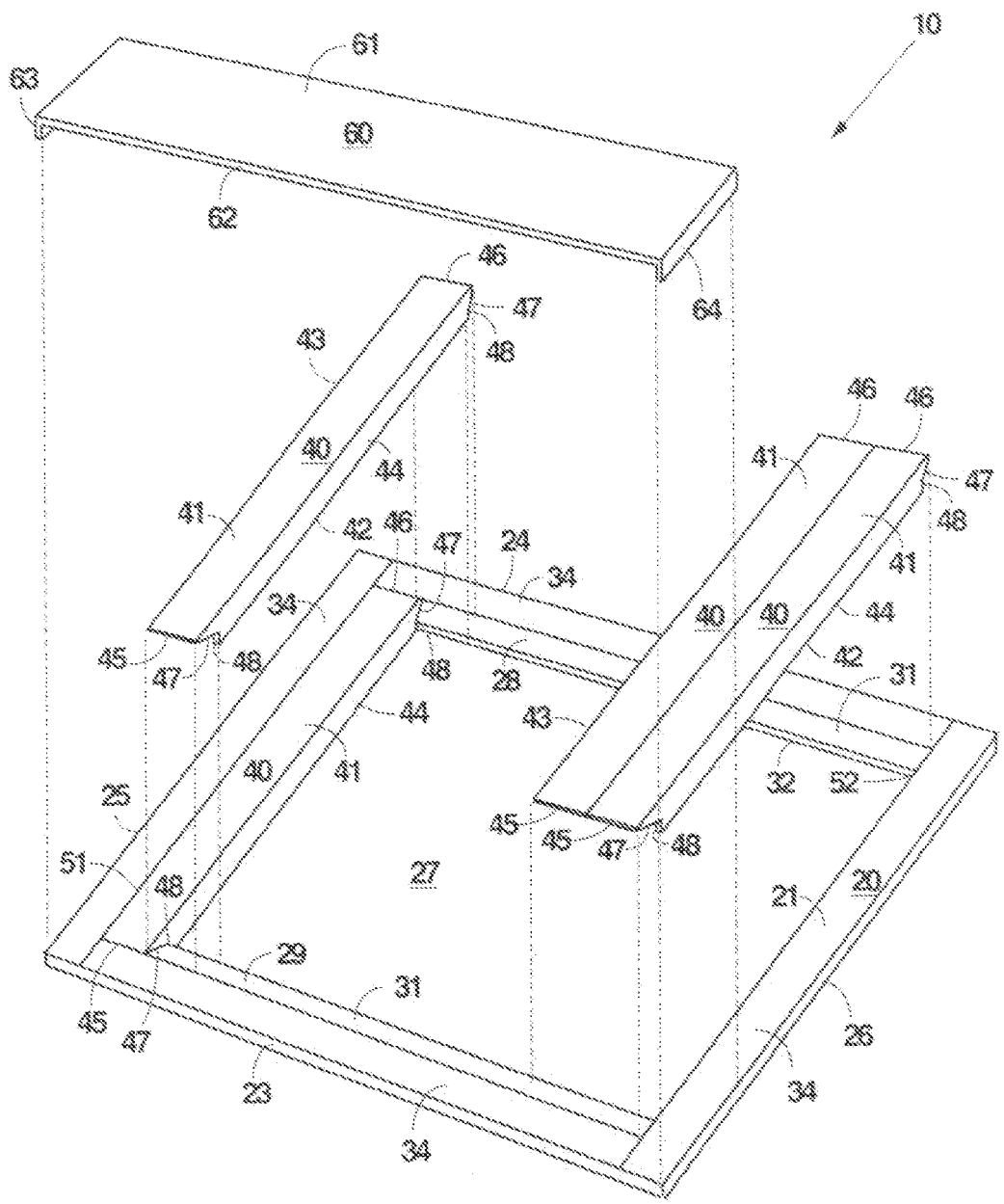
FIG. 1 is a partially exploded top perspective view illustrating an adapter according to the preferred embodiment.

As required, detailed embodiments of the present invention are disclosed herein, however, it is to be understood that the disclosed embodiments are merely exemplary of the invention, which may be embodied in various forms. Figures are not necessarily to scale, and some, features may be exaggerated to show details of particular components or steps.

FIGS. 1-10 illustrate an adapter 10. The adapter 10 is designed to allow an icemaker 100 to integrate with a beverage dispenser 200. The adapter 10 is placed on top of the beverage dispenser 200 to allow fitting of the icemaker 100 atop the beverage dispenser 200. The adapter 10 includes a base 20, brackets 40, and a lid 60.

The base 20 can be made of any suitable material such as plastic, aluminum, or stainless steel. The base 20 includes a top 21, a bottom 22, a front 23, a back 24, and sides 25-26. Furthermore, the base 20 includes rails 28 and 29 designed to engage the brackets 40. The base 20 defines a passage 27 that includes a first side 51 and a second side 52. The passage 27 passes from the top 21 to the bottom 22 of the base 20. The top 21 includes receiving surfaces 34 that may be employed to support a portion of the icemaker 100. While the base 20 may comprise any shape configured to rest atop the beverage dispenser 200, the base 20 according to the preferred embodiment typically includes a four-sided configuration such as a square or rectangle.

Figure 2:
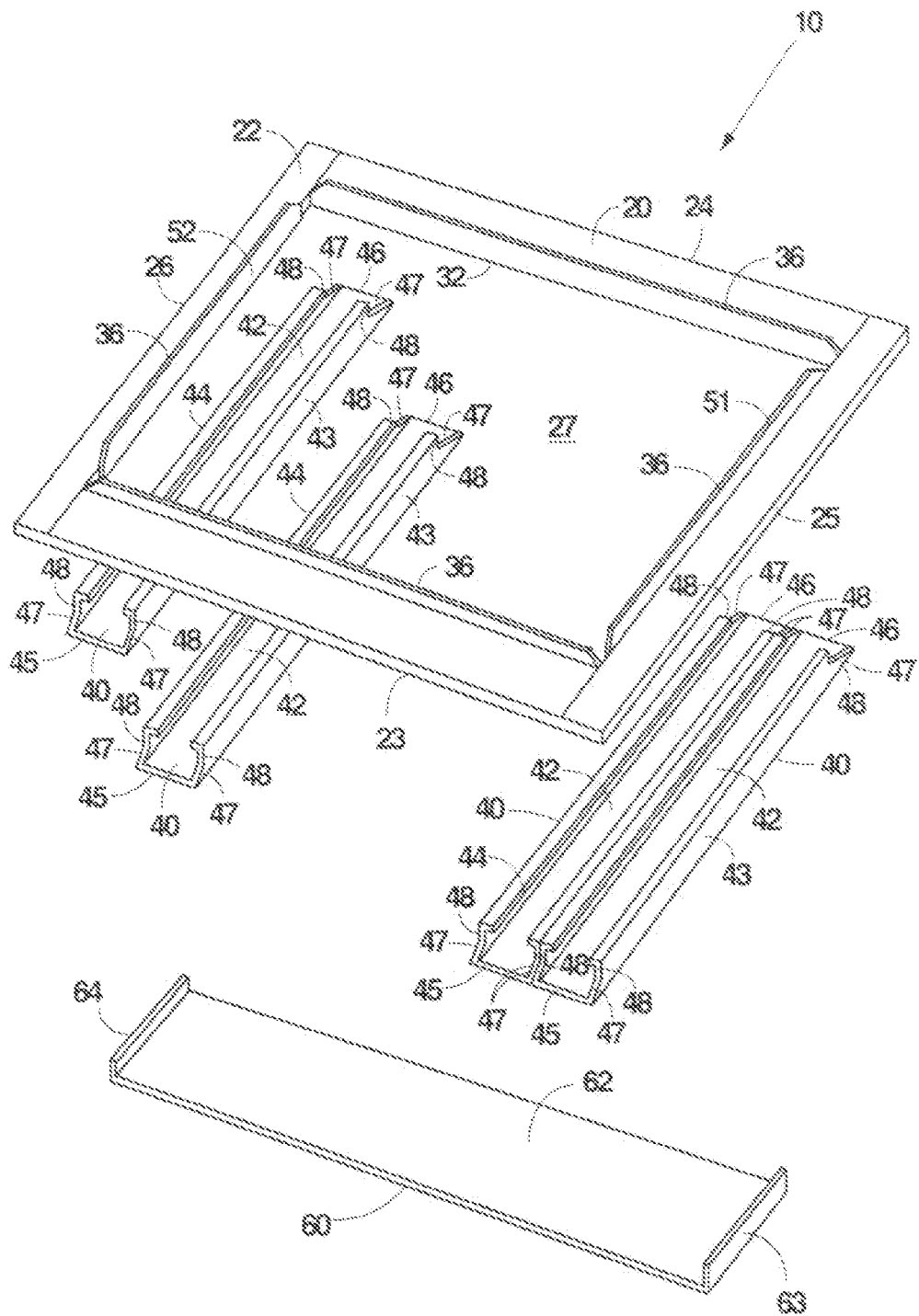
FIG. 2 is an exploded bottom perspective view illustrating the adapter.

As illustrated in FIG. 2, the bottom 22 includes an internal lip 36 that engage the top of the beverage dispenser 200 to secure the base 20 with the beverage dispenser 200. In the preferred embodiment, the internal lip 36 is four discontinuous pieces that surround the passage 27. However, one of ordinary skill in the art will recognize that the internal lip 36 may be configuration such as a continuous one that allows the base 20 of the adapter 10 to engage the beverage dispenser 200. In addition, the bottom 22 may include an external lip that engages the top of the beverage dispenser 200 and aids the internal lip 36 in securing the base 20 with the beverage dispenser 200.

Figure 6:
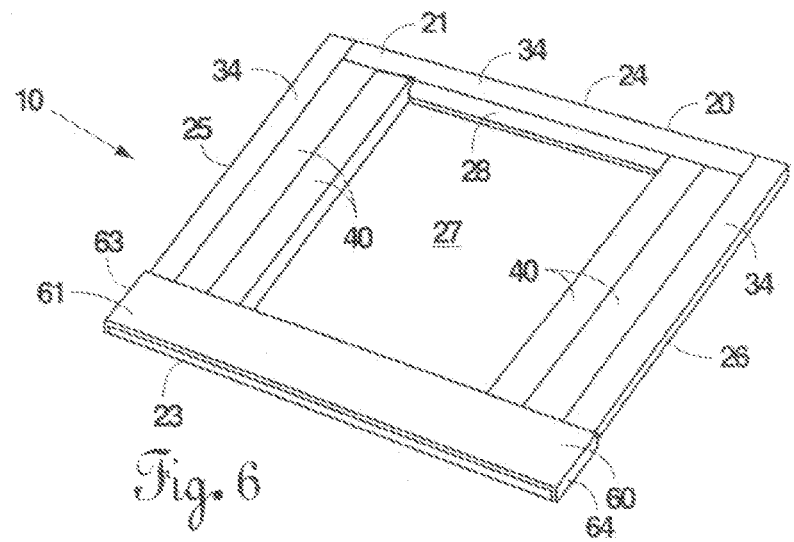
FIG. 6 is a perspective view illustrating the adapter.
Figure 7:
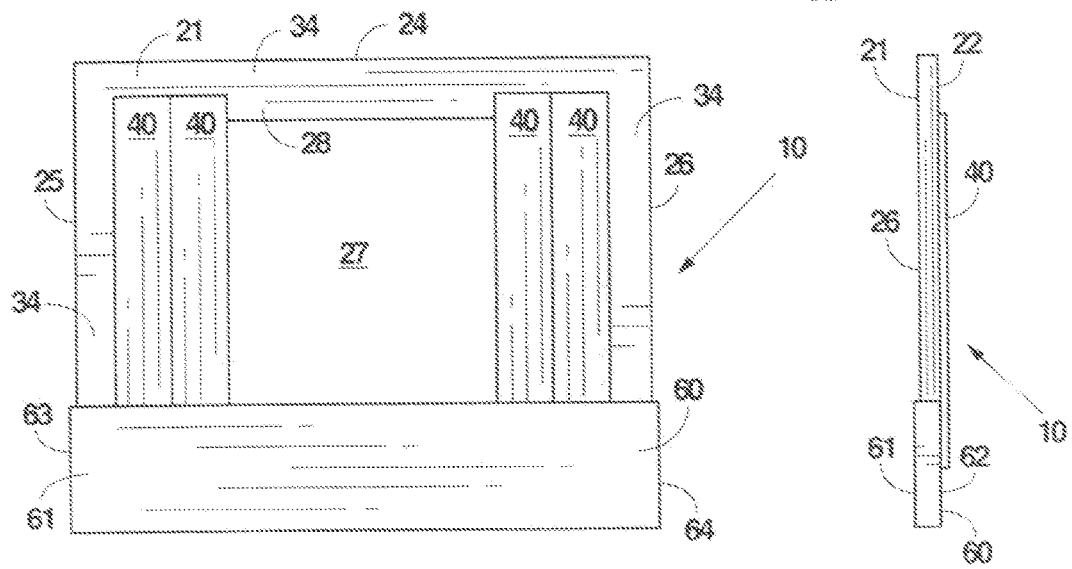
FIG. 7 is a top view illustrating the adapter.
Figure 9:
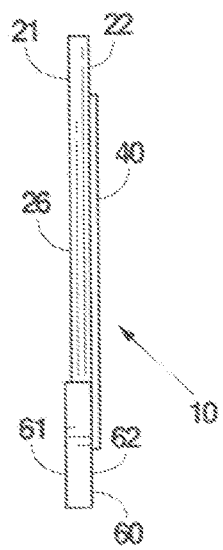
FIG. 9 is a side view illustrating the adapter.
Figure 8:
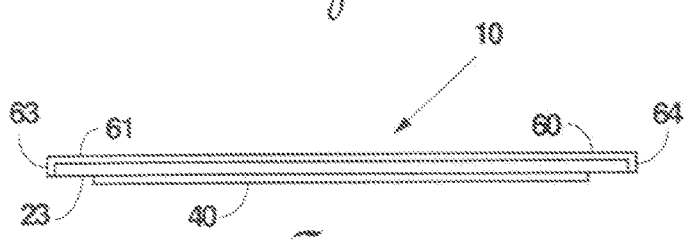
FIG. 8 is a front view illustrating the adapter.

FIGS. 4-6 illustrate the rails 28 and 29 of the base 20. The rails 28 and 29 of the base 20 each include a first bracket engagement surface 31 and a second bracket engagement surface 32. In the preferred embodiment, the first bracket engagement surface 31 slopes downward toward the passage 27 and the second bracket engagement surface 32 is vertical in elation to the passage 27. The shape of the first bracket engagement surface 31 and the second bracket engagement surface 32 allow the bracket 40 to be placed within the passage 27 and maneuvered within the passage 27 to permit proper integration between the beverage dispenser 200 and the icemaker 100. In the preferred embodiment, the rails 28 and 29 are located opposite each other bordering the passage 27 and in an interior portion of the front 23 and the back 24 of the base 20. However, one of ordinary skill in the art will recognize that the rails 28 and 29 may be located opposite of each other bordering the passage 27 and in an interior portion of the sides 25 and 26.

The bracket 40 includes a top 41, a bottom 42, and sides 43 and 44. In addition, the bracket 40 includes rail engagement members 45 and 46 each including a first rail engagement surface 47 and a second rail engagement surface 48 located at each end of the bracket 40. The bracket 40 inserts within the passage 27 such that the bracket 40 engages the rails 28 and 29. In particular, the first rail engagement surfaces 47 of the rail engagement members 45 and 46 are angled such that the first rail engagement surfaces 47 align and engage the first bracket engagement surfaces 31 of the rails 28 and 29. The second rail engagement surface 48 of the rail engagement members 45 and 46 are vertical such that the second rail engagement surfaces 48 align with and engage the second bracket engagement surfaces 32 of the rails 28 and 29. The bracket 40 is designed to conceal gaps between the beverage dispenser 200 and the icemaker 100 and will be explained with greater detail herein. Furthermore, the bracket 40 or brackets 40 integrate with base 20 in order to accommodate different sizes of icemakers 100. In particular, one of ordinary skill in the art will recognize that no brackets 40 may be used to accommodate a larger icemaker 100 or one or more brackets 40 may be used in order to accommodate a smaller icemaker 100. The widths of brackets 40 according to the preferred embodiment are uniform to simplify their manufacture, and the specific width is selected for universality to accommodate the largest number of different icemakers 100. Nevertheless, it should be understood that the widths of the brackets 40 may vary.

FIGS. 1, 2, and 6-9 illustrate the lid 60. The lid 60 includes a top 61, a bottom 62, and sides 63 and 64. The lid 60 inserts over the top 21 of the base 20. In particular, the sides 63 and 64 are placed over and engage the sides 25 and 26. The lid 60 is designed to close out and conceal a storage chamber area 245 on the beverage dispenser 200 and will be explained in greater detail herein.

Figures 10, 11:
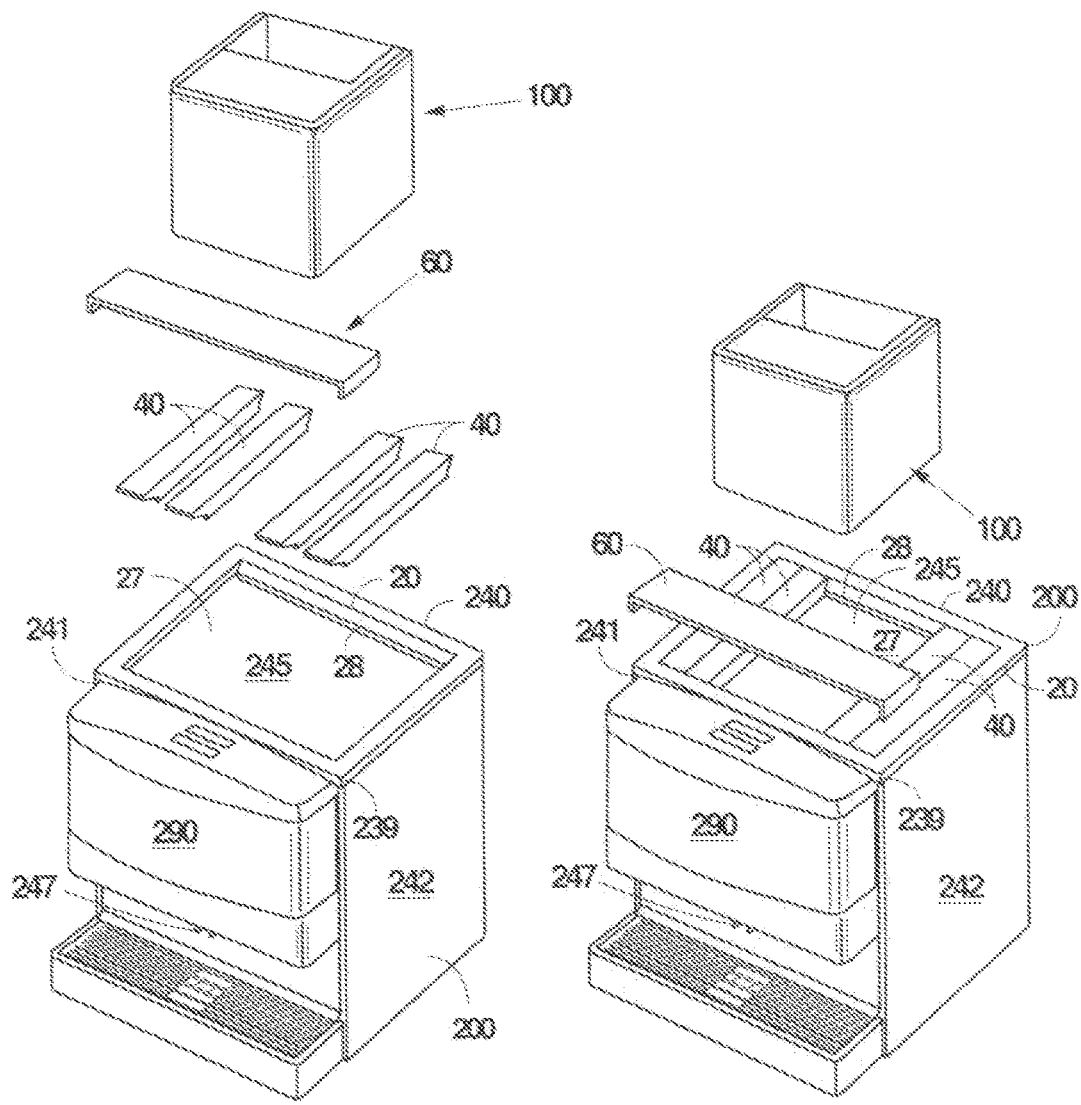
FIGS. 10-12 are perspective views illustrating the adapter integrating an icemaker with a beverage dispenser.
Figure 12:
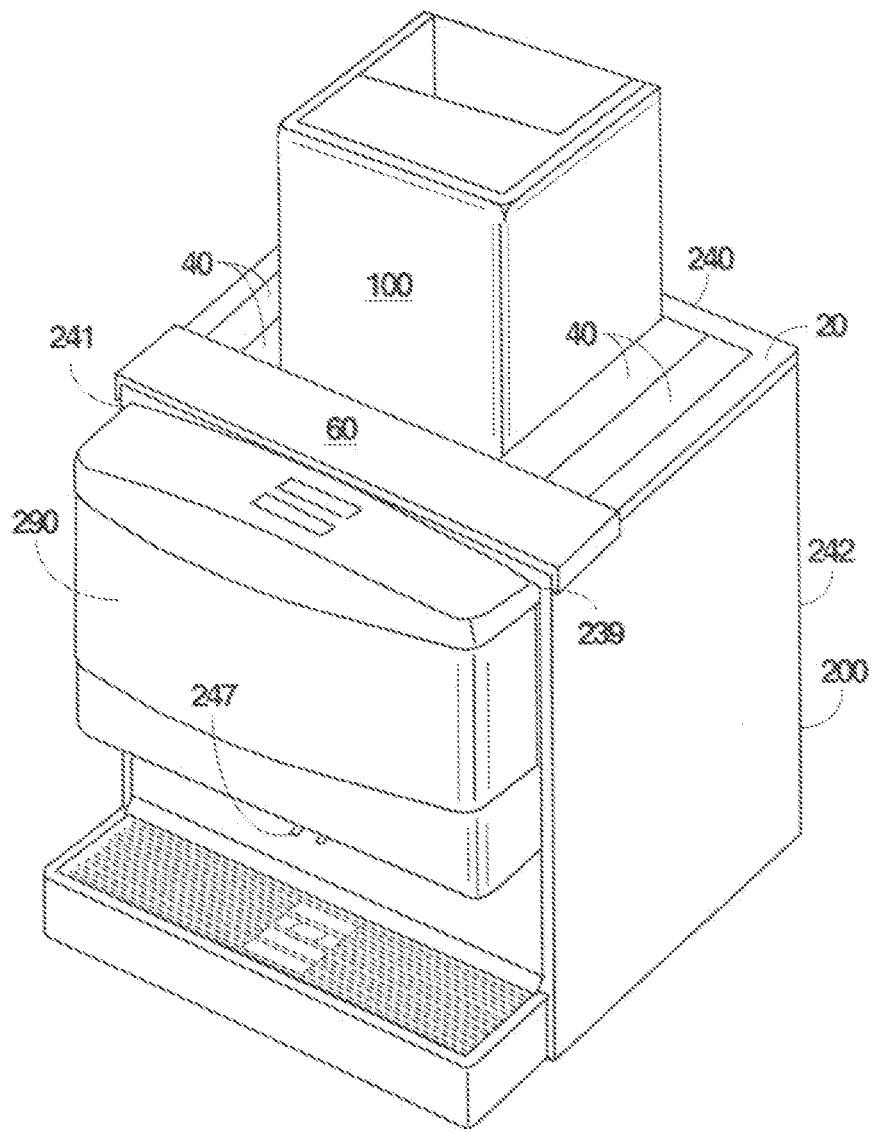

FIGS. 10-12 illustrate the icemaker 100 and the beverage dispenser 200. The icemaker 100 is one well known to one of ordinary skill in the art. In the preferred embodiment, the icemaker 100 is mounted on top of the beverage dispenser 200 such that the icemaker 100 automatically loads the beverage dispenser 200 with ice. In particular, the ice made by the icemaker 100 drops by gravity into the storage chamber area 245 of a beverage dispenser 200 and is then dispensed from the beverage dispenser 200 when a lever or button for ice is pushed.

The beverage dispenser 200 dispenses various forms of beverages, including soft drinks, uncarbonated drinks, water, flavored drinks, and concentrates thereof. In the preferred embodiment, the beverage dispenser 200 includes a rear wall 240, a front wall 239, a first sidewall 241, a second sidewall 242, and a display 290. In addition, the beverage dispenser 200 further includes an upper face (not shown) and a storage chamber 245 disposed within the walls 239, 240, 241, and 242. The upper face receives the base 20 of the adapter 10 and rides along the uppermost edges of the dispenser walls 239, 240, 241, and 242. The storage chamber 245 is typically utilized to store a product for dispensing, illustratively ice. The beverage dispenser 200 may still further include a dispensing port, and an actuation lever 247 for receiving the signal to move the product from the storage chamber 245 to the dispensing port for use.

FIGS. 10-12 illustrate the integration of the icemaker 100 and the beverage dispenser 200 using the adapter 10. The integration of the icemaker 100 and the beverage dispenser 200 begins by placing the base 20 of the adapter 10 onto the upper face of the beverage dispenser 200. The base 20 is oriented on the beverage dispenser 200, such that the front 23, the back 24, and sides 25-26 of the base 20 align with the front wall 239, the rear wall 240, the first side wall 241, and the second side wall 242 of the beverage dispenser 200, respectively. Specifically, after the base 20 aligns with the beverage dispenser 200, the base 20 sits atop the upper face of the beverage dispenser 200 such that the internal lips 36 of the base 20 reside adjacent interior portions of the front 11239, the first and second side walls 241 and 242, and the rear wall 240. The internal lips 36 secure the base 20 of the adapter 10 with the beverage dispenser 200 and prevent the base 20 from sliding off the beverage dispenser 200.

Once the base 20 has been placed on the beverage dispenser 200, one or more brackets 40 may be installed within the base 20 to allow integration of the icemaker 100 with the beverage dispenser 200. If one bracket 40 is required to integrate the icemaker 100 with the beverage dispenser 200, a first bracket 40 is placed within the passage 27 of the base 20 such that the first rail engagement surfaces 45 and 46 align and engage the first bracket engagement surface 31 of the rails 28 and 29. Furthermore, the second rail engagement surfaces 47 and 48 align with and engage the second bracket engagement surface 32 of the rails 28 and 29. After installing the bracket 40, the first bracket 40 is moved to a desired location within the passage 27. In particular, the first bracket 40 is moved within the passage 27 such that the first bracket 40 resides against either the first side 51 or the second side 52 of the passage 27.

If two brackets 40 are required to integrate the icemaker 100 with the beverage dispenser 200, a second bracket 40 is placed within the passage 27 of the base 20 such that the first rail engagement surfaces 45 and 46 align and engage the first bracket engagement surface 31 of the rails 28 and 29. Furthermore, the second rail engagement surfaces 47 and 48 align with and engage the second bracket engagement surface 32 of the rails 28 and 29. After installing the first bracket 40 and the second bracket 40, the first bracket 40 and the second bracket 40 are moved to a desired location within the passage 27. In particular, the second bracket 40 is moved within the passage 27 such that the second bracket 40 engages the first bracket 40. The abutting first and second brackets 40 may reside against either the first side 51 or the second side 52 of the passage 27. Alternatively, the first bracket 40 and the second bracket 40 may reside opposite each other against the first side 51 and the second side 52 of the passage 27.

If three brackets 40 are required to integrate the icemaker 100 with the beverage dispenser 200, a third bracket 40 is placed within the passage 27 of the base 20 such that the first rail engagement surfaces 45 and 46 align and engage the first bracket engagement surface 31 of the rails 28 and 29. Furthermore, the second rail engagement surfaces 47 and 48 align with and engage the second bracket engagement surface 32 of the rails 28 and 29. After installing the first bracket 40, the second bracket 40, and the third bracket 40, the first bracket 40, the second bracket 40, and the third bracket 40 are moved to a desired location within the passage 27. In particular, the second bracket 40 is moved within the passage 27 such that the second bracket 40 engages the first bracket 40. The abutted first and second brackets 40 may reside against either the first side 51 or the second side 52 of the passage 27. The third bracket 40 will then reside opposite the first bracket 40 and the second bracket 40 against the first side 51 or the second side 52 of the passage 27. Alternatively, the second bracket 40 and the third bracket 40 are moved within the passage 27 such that the second bracket 40 engages the first bracket 40 and the third bracket engages the second bracket 40. The abutted first, second, and third brackets 40 may reside against either the first side 51 or the second side 52 of the passage 27.

If four brackets 40 are required to integrate the icemaker 100 with the beverage dispenser 200, a fourth bracket 40 is placed within the passage 27 of the base 20 such that the first rail engagement surfaces 45 and 46 align and engage the first bracket engagement surface 31 of the rails 28 and 29. Furthermore, the second rail engagement surfaces 47 and 48 align with and engage the second bracket engagement surface 32 of the rails 28 and 29. After installing the first bracket 40, the second bracket 40, the third bracket 40, and the fourth bracket 40, the first bracket 40, the second bracket 40, the third bracket 40, and the fourth bracket 40 are moved to a desired location within the passage 27. In particular, the second bracket 40 is moved within the passage 27 such that the second bracket 40 engages the first bracket 40. The abutted first and second brackets 40 may reside against either the first side 51 or the second side 52 of the passage 27. The third bracket 40 is moved within the passage 27 such that the third bracket 40 engages the fourth bracket 40. The abutted third and fourth brackets 40 will then be positioned opposite the first bracket 40 and the second bracket 40 against the first side 51 or the second side 52 of the passage 27. Conversely, the second bracket 40, the third bracket 40, and the fourth bracket 40 are moved within the passage 27 such that the second bracket 40 engages the first bracket 40, the third bracket engages the second bracket 40, and the fourth bracket 40 engages the third bracket 40. The abutted first, second, third, and fourth brackets 40 may reside against either the first side 51 or the second side 52 of the passage 27. Alternatively, the second bracket 40 and the third bracket 40 are moved within the passage 27 such that the second bracket 40 engages the first bracket 40 and the third bracket engages the second bracket 40. The abutted first, second, and third brackets 40 may reside against either the first side 51 or the second side 52 of the passage 27. The fourth bracket 40 will then reside opposite the first, second, and third brackets 40, the against the first side 51 or the second side 52 of the passage 27.

After securing the base 20 and installing one or more of the brackets 40, the beverage dispenser 200 is ready to receive the icemaker 100. The icemaker 100 is placed on top of the adapter 10. In particular, the icemaker 100 resides on and is supported by the one or more brackets 40 alone or if necessary in combination with any portion of the receiving surfaces 34 of the base 20 necessary to stabilize the icemaker 100 atop the beverage dispenser 200. In addition, the icemaker 10 is positioned on the adapter 10 such that a dispensing zone 109 lies above the passage 27, and ice dispensed from the icemaker 100 falls through the passage 27 to enter the storage chamber 245. The icemaker 100 includes rubber feet (not shown) that create friction sufficient to prevent movement of the icemaker 100 from atop the beverage dispenser 200. In addition, one of ordinary skill in the art will recognize that the icemaker 100 may be secured to the adapter 10 or may be restrained with an anti-slide mechanism (not shown) to minimize the possibility of the icemaker 100 falling from the top of the beverage dispenser 200.

With the adapter 10 and the icemaker 100 installed on the beverage dispenser 200, a portion of the storage chamber area 245 is still accessible, such that an operator may scoop ice manually or to provide access for cleansing operations. The storage chamber area 245 may be fully covered with the lid 60. Specifically, the lid 60 inserts over the top 21 of the base 20 such that the sides 63 and 64 of the lid 60 are placed over and engage the sides 25 and 26 of the base 20 thereby fully covering the storage chamber area 245.

The adapter 10 allows beverage dispenser 200 to accommodate icemakers 100 of different sizes and allows the icemaker 100 to reside at multiple positions on the adapter 10. A icemaker 100 may reside solely on the receiving surfaces 34 of the base 20 and a smaller icemaker 100 may reside on a combination of the receiving surfaces 34 and the brackets 40 or solely on the brackets 40. Furthermore, the base 20 and the brackets 40 allow an icemaker 100 to be positioned centrally or to be offset to the left, right, front, or back of a central portion of the passage 27 thereby allowing the icemaker 100 to reside centrally or to be offset to the left, right, front, or back of a central portion above the storage chamber 245 using a combination of once or more brackets 40 as previously described. As described above, an icemaker 100 can be positioned centrally in the passage 27 using no brackets 40 or an even number of brackets 40 such as 2 or 4 placed opposite each other on the first side 51 and the second side 52 of the passage 27. Conversely, an icemaker 100 may be offset to the left, right, front, or back of a central portion of the passage 27 using a combination of one or more brackets 40 as previously described.

Although the present invention has been described in terms of the foregoing preferred embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing detailed description; rather, it is defined only by the claims that follow.

The invention claimed is:

1. An adapter for integrating an icemaker with a beverage dispenser, comprising:
   a base comprising a four-sided configuration defining a passage therethrough whereby the base removably sits atop the beverage dispenser such that the passage communicates with the beverage dispenser, the base including a top supporting thereon at least a portion of the icemaker, the base further including a first rail between a first side and an opposite second side of the base whereby the first rail extends from the top into the passage and a second rail between the first side and the opposite second side of the base whereby the second rail extends from the top into the passage opposite to the first rail, wherein the first rail and the second rail each define a first bracket engagement surface extending continuously along the first rail and the second rail from the first side to the opposite second side; and
   at least a first bracket including a first end defining a first rail engagement surface and a second end defining a first rail engagement surface, wherein the bracket inserts within the passage of the base such that the first rail engagement surface of the first end resides atop the first bracket engagement surface of the first rail and the first rail engagement surface of the second end resides atop the first bracket engagement surface of the second rail, further wherein the bracket is movable to any location along the first bracket engagement surfaces of the first and second rails, thereby accommodating integration of icemakers having different dimensions with the beverage dispenser.

2. The adapter for integrating an icemaker with a beverage dispenser according to claim 1, wherein the first rail and the second rail each further define a second bracket engagement surface extending from the first bracket engagement surface.

3. The adapter for integrating an icemaker with a beverage dispenser according to claim 1, wherein the top of the base includes receiving surfaces that support thereon at least a portion of the icemaker.

4. The adapter for integrating an icemaker with a beverage dispenser according to claim 1, wherein a bottom of the base includes a stop adapted to secure the base with the beverage dispenser.

5. The adapter for integrating an icemaker with a beverage dispenser according to claim 4, wherein the stop comprises an internal lip extending from the bottom of the base and adapted to secure the base with the beverage dispenser.

6. The adapter for integrating an icemaker with a beverage dispenser according to claim 1, further comprising a lid including sides that fit over and engage the sides of the beverage dispenser in order to conceal a storage chamber area of the beverage dispenser.

7. The adapter for integrating an icemaker with a beverage dispenser according to claim 2, wherein the first bracket further includes at the first end a second rail engagement surface extending from the first rail engagement surface and at the second end a second rail engagement surface extending from the first rail engagement surface, wherein the second rail engagement surface of the first end resides atop the second bracket engagement surface of the first rail and the second rail engagement surface of the second end resides atop the second bracket engagement surface of the second rail.

8. The adapter for integrating an icemaker with a beverage dispenser according to claim 1, wherein the first bracket is moved within the passage along the first and second rails such that the first bracket resides against one of the first side and the opposite second side of the passage.

9. The adapter for integrating an icemaker with a beverage dispenser according to claim 8, wherein the icemaker sits atop the first bracket and at least a portion of the top of the base such that the icemaker is offset from a central portion of the passage.

10. The adapter for integrating an icemaker with a beverage dispenser according to claim 8, wherein the adapter further comprises a second bracket including a first end defining a first rail engagement surface and a second end defining a first rail engagement surface, wherein the second bracket inserts within the passage of the base such that the first rail engagement surface of the first end resides atop the first bracket engagement surface of the first rail and the first rail engagement surface of the second end resides atop the first bracket engagement surface of the second rail, further wherein the second bracket is movable to any location along the first bracket engagement surfaces of the first and second rails, thereby accommodating integration of icemakers having different dimensions with the beverage dispenser.

11. The adapter for integrating an icemaker with a beverage dispenser according to claim 10, wherein the second bracket is moved within the passage such that the second bracket resides adjacent the first bracket.

12. The adapter for integrating an icemaker with a beverage dispenser according to claim 11, wherein the icemaker sits atop the first and the second bracket and at least a portion of the top of the base such that the icemaker is offset from a central portion of the passage.

13. The adapter for integrating an icemaker with a beverage dispenser according to claim 10, wherein the second bracket is moved within the passage such that the second bracket resides opposite the first bracket against one of the first side and the second side of the passage.

14. The adapter for integrating an icemaker with a beverage dispenser according to claim 13, wherein the icemaker sits atop the first and the second bracket such that the icemaker is positioned in a central portion of the passage.

15. An adapter for integrating an icemaker with a beverage dispenser, comprising:
   a base comprising a four-sided configuration defining a passage therethrough whereby the base removably sits atop the beverage dispenser such that the passage communicates with the beverage dispenser, the base including, a top supporting thereon at least a portion of the icemaker, the base further including a first rail between a first side and an opposite second side of the base whereby the first rail extends from the top into the passage and a second rail between the first side and the opposite second side of the base whereby the second rail extends from the top into the passage opposite to the first rail, wherein the first rail and the second rail each define a first bracket engagement surface extending continuously along the first rail and the second rail from the first side to the opposite second side; and a plurality of brackets each including a first end defining a first rail engagement surface and a second end defining a first rail engagement surface, wherein the brackets insert within the passage of the base such that the first rail engagement surfaces of the first ends reside atop the first bracket engagement surface of the first rail and the first rail engagement surfaces of the second ends reside atop the first bracket engagement surface of the second rail, further wherein the brackets are movable to any location along the first bracket engagement surfaces of the first and second rails, thereby accommodating integration of icemakers having different dimensions with the beverage dispenser.

16. The adapter for integrating an icemaker with a beverage dispenser according to claim 15, wherein the brackets are moved within the passage along the first and second rails such that the bracket reside against one of the first side and the second side of the passage, thereby allowing an icemaker to be positioned offset from a central portion of the passage.

17. The adapter for integrating an icemaker with a beverage dispenser according to claim 15, wherein the brackets are moved within the passage along the first and second rails such that one or more of the brackets resides against the first side of the passage and one or more of the brackets resides against the second side of the passage, thereby allowing an icemaker to be positioned centrally with respect to a central portion of the passage.

18. The adapter for integrating an icemaker with a beverage dispenser according to claim 15, wherein the first rail and the second rail each further define a second bracket engagement surface extending from the first bracket engagement surface.

19. The adapter for integrating an icemaker with a beverage dispenser according to claim 18, wherein the brackets each further include at the first end a second rail engagement surface extending from the first rail engagement surface and at the second end a second rail engagement surface extending from the first rail engagement surface, wherein the second rail engagement surfaces of the first ends reside atop the second bracket engagement surface of the first rail and the second rail engagement surfaces of the second ends reside atop the second bracket engagement surface of the second rail.

* * * * *